(12) United States Patent
Nakano et al.

(10) Patent No.: US 11,597,261 B2
(45) Date of Patent: Mar. 7, 2023

(54) CONTROL APPARATUS, VEHICLE, AND CONTROL METHOD

(71) Applicant: TOYOTA JIDOSHA KABUSHIKI KAISHA, Toyota (JP)

(72) Inventors: Keiko Nakano, Kawasaki (JP); Yu Nagata, Nagoya (JP); Takashi Hayashi, Aichi-gun (JP); Ryota Kondo, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 361 days.

(21) Appl. No.: 16/938,009

(22) Filed: Jul. 24, 2020

(65) Prior Publication Data

US 2021/0023918 A1    Jan. 28, 2021

(30) Foreign Application Priority Data

Jul. 24, 2019   (JP) .............................. JP2019-136442

(51) Int. Cl.
| | | |
|---|---|---|
| *B60J 3/04* | (2006.01) | |
| *G02F 1/01* | (2006.01) | |
| *G06K 9/00* | (2022.01) | |
| *G09F 21/04* | (2006.01) | |
| *G06V 20/56* | (2022.01) | |
| *G06V 20/59* | (2022.01) | |
| *G06V 40/10* | (2022.01) | |

(52) U.S. Cl.
CPC .............. *B60J 3/04* (2013.01); *G02F 1/0121* (2013.01); *G06V 20/56* (2022.01); *G06V 20/59* (2022.01); *G06V 40/10* (2022.01); *G09F 21/04* (2013.01)

(58) Field of Classification Search
CPC .......... B60J 3/04; G02F 1/0121; G06V 20/56; G06V 20/59; G06V 40/10; G09F 21/04; G09F 21/048; G09F 21/049; B60R 1/001; B60R 11/0229
See application file for complete search history.

(56) References Cited

U.S. PATENT DOCUMENTS

| | | | | |
|---|---|---|---|---|
| 8,866,906 B1* | 10/2014 | Abad | ........................ | H04N 7/18 348/148 |
| 2003/0147247 A1* | 8/2003 | Koike | .................... | B60Q 9/004 362/464 |
| 2005/0280514 A1* | 12/2005 | Doan | ..................... | B60K 35/00 340/425.5 |
| 2011/0018738 A1* | 1/2011 | Feroldi | .................... | B60Q 1/50 340/905 |

(Continued)

FOREIGN PATENT DOCUMENTS

| | | |
|---|---|---|
| JP | 2007326526 A | 12/2007 |
| JP | 2009255740 A | 11/2009 |

(Continued)

*Primary Examiner* — Mussa A Shaawat
(74) *Attorney, Agent, or Firm* — Oliff PLC

(57) ABSTRACT

A control apparatus, a vehicle and a control method which improve user-friendliness of a technique for providing information to an interior or an exterior of a vehicle are provided. The control apparatus of the vehicle includes a controller which changes the degree of visibility between the exterior and the interior of the vehicle based on at least one of first information indicating a state of the exterior of the vehicle and second information indicating a state of the interior of the vehicle.

20 Claims, 5 Drawing Sheets

(56) References Cited

U.S. PATENT DOCUMENTS

| | | | | |
|---|---|---|---|---|
| 2012/0310536 A1* | 12/2012 | Katayama | ............ | G09B 29/006 |
| | | | | 702/3 |
| 2013/0258693 A1* | 10/2013 | Hatakeyama | .......... | G02B 27/01 |
| | | | | 362/543 |
| 2017/0229098 A1* | 8/2017 | Uchida | ................. | G09F 21/049 |
| 2018/0129981 A1 | 5/2018 | Fujimoto | | |
| 2020/0034982 A1* | 1/2020 | Nishimura | .............. | H04W 4/44 |
| 2020/0172008 A1* | 6/2020 | Shidoh | ..................... | B60Q 1/50 |

FOREIGN PATENT DOCUMENTS

| JP | 2018-073351 A | 5/2018 |
|---|---|---|
| JP | 2018144621 A | 9/2018 |
| JP | 2019064376 A | 4/2019 |

\* cited by examiner

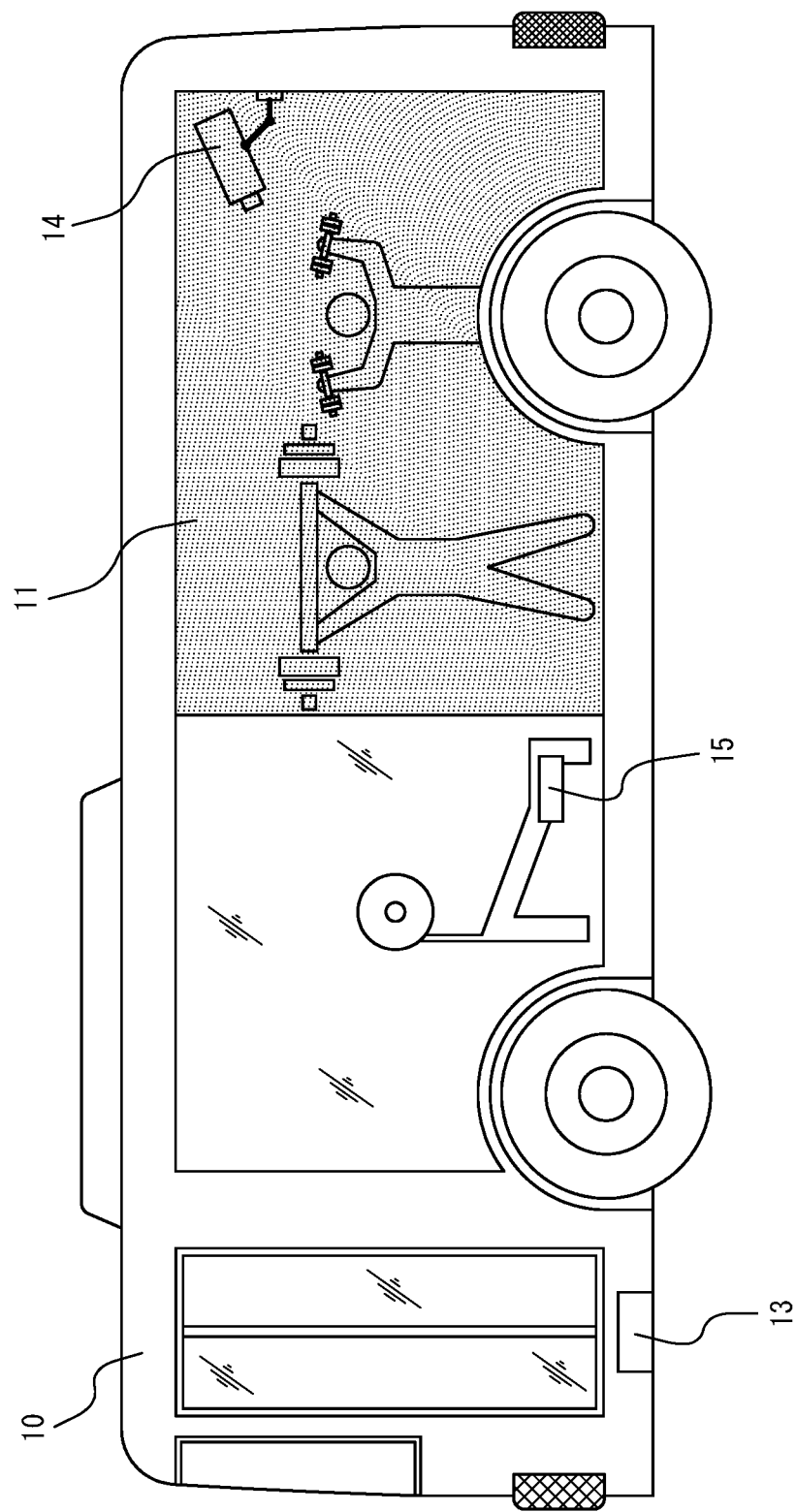

CONTROL APPARATUS, VEHICLE, AND CONTROL METHOD

CROSS-REFERENCE TO RELATED APPLICATION

The present application claims priority to Japanese Patent Application No. 2019-136442 filed on Jul. 24, 2019, the entire disclosure of which is incorporated herein by reference.

TECHNICAL FIELD

The present disclosure relates to a control apparatus, a vehicle, and a control method.

BACKGROUND

Conventionally, techniques for providing information to the interior or the exterior of a vehicle are known. For example, JP 2018-073351 A (PTL 1) discloses a vehicle control system which outputs information as to whether it is possible to board a vehicle, to the exterior of the vehicle.

CITATION LIST

Patent Literature

PTL 1: JP2018073351A

SUMMARY

In recent years, it is desired to provide various kinds of information to the interior or the exterior of a vehicle in association with provision of a service to passengers of the vehicle. For example, it is desired to allow the condition of the interior of a vehicle to be viewed from the exterior of the vehicle or the condition of the exterior of the vehicle to be viewed from the interior of the vehicle in accordance with a state of the service, or the like, of the vehicle. Therefore, it is desired to further improve the user-friendliness of techniques for providing information to the interior or the exterior of vehicles.

An object of the present disclosure which has been made in view of such circumstances is to provide a control apparatus, a vehicle, and a control method which improve the user-friendliness of a technique for providing information to the interior or the exterior of a vehicle.

A control apparatus according to one embodiment of the present disclosure is a control apparatus for a vehicle, including, a controller configured to change the degree of visibility between an exterior and an interior of the vehicle based on at least one of first information indicating a state of the exterior of the vehicle and second information indicating a state of the interior of the vehicle.

A control method according to one embodiment of the present disclosure is a control method for a vehicle, the control method including a changing, by a controller, the degree of visibility between an exterior and an interior of the vehicle based on at least one of first information indicating a state of the exterior of the vehicle and second information indicating a state of the interior of the vehicle.

According to the control apparatus, the vehicle and the control method according to one embodiment of the present disclosure, the user-friendliness of a technique for providing information to the interior or the exterior of a vehicle is improved.

BRIEF DESCRIPTION OF THE DRAWINGS

In the accompanying drawings:

FIG. 5 is further schematic diagram illustrating the outline of the vehicle according to one embodiment of the present disclosure.

DETAILED DESCRIPTION

Figure 1:
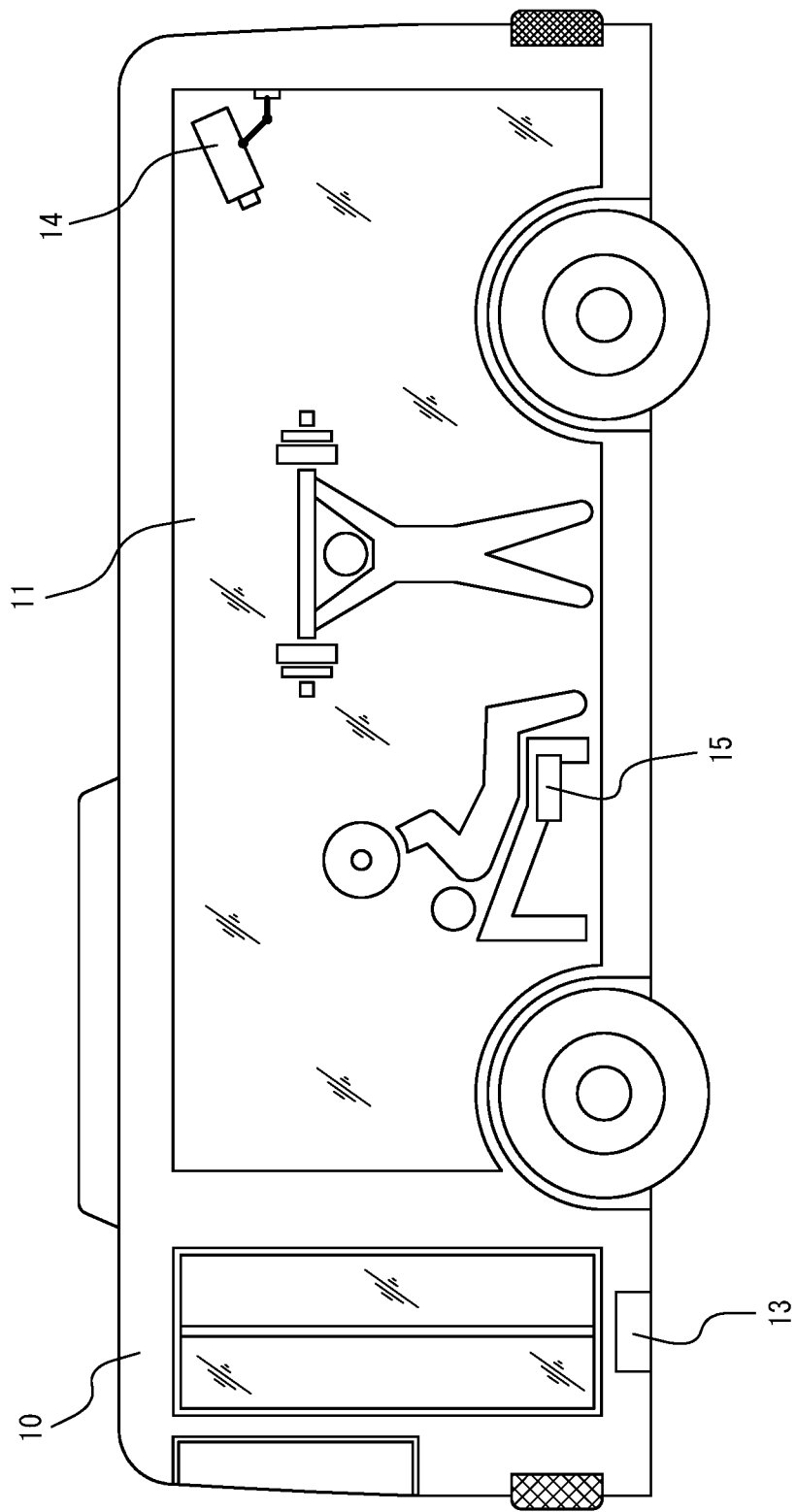
FIG. 1 is a schematic diagram illustrating an outline of a vehicle according to one embodiment of the present disclosure.

One embodiment of the present disclosure will be described below with reference to the drawings.

In the respective drawings, the same reference numerals are assigned to the same or corresponding parts. In the description of the present embodiment, descriptions of the same or corresponding parts will be omitted or simplified as appropriate.

An outline of the present embodiment will be described with reference to FIG. 1 and FIG. 2.

As illustrated in FIG. 1, a vehicle 10 is, for example, a vehicle in which the interior of the vehicle 10 is a gym provided with equipment for passengers to exercise. However, the vehicle 10 is not limited to the example illustrated in FIG. 1, and may be a vehicle such as an on-demand bus, a hire car, a shared car or a taxi. In the present embodiment, the vehicle 10 may be driven by a driver or driving may be automated at an any appropriate level. The level of automation is, for example, one of the levels from level 1 to level 5 as specified by the Society of Automotive Engineers (SAE).

The vehicle 10 includes a visibility unit 11 which can change the degree of visibility between the exterior and the interior of the vehicle 10. In the present embodiment, the degree of visibility is a degree to which a human is able to recognize a visual recognition target. The degree of visibility may indicate the degree to which the details of a visual recognition target can be recognized or may indicate how many portions of a visual recognition target can be viewed. The visibility unit 11 includes, for example, a windshield whose transmittance can be changed. The vehicle 10 controls the visibility unit 11 to change the degree of visibility between the exterior and the interior of the vehicle 10 on the basis of at least one of first information indicating a state of the exterior of the vehicle 10 and second information indicating a state of the interior of the vehicle 10.

For example, the vehicle 10 determines the type of an area through which the vehicle 10 travels from the first information indicating the state of the exterior of the vehicle 10. In a case in which it is determined that the type of the area through which the vehicle 10 travels is an urban area, the vehicle 10 controls the visibility unit 11 to increase the degree of visibility between the exterior and the interior of the vehicle 10 as illustrated in FIG. 1. In this manner, the vehicle 10 can allow prospective customers who are walking outside the vehicle 10 to view the condition of the interior of the vehicle 10 to improve the effectiveness of advertising for services provided inside the vehicle 10. Meanwhile, in a case in which it is determined that the type of the area through which the vehicle 10 travels is a suburb, the vehicle 10 may increase the degree of visibility of the vehicle 10. In this manner, in a case in which the likelihood that the interior of the vehicle 10 is viewed from outside is lower, the vehicle 10 can improve level of satisfaction of passengers in the vehicle 10 by showing scenery outside the vehicle 10 to the passengers inside the vehicle 10.

Figure 2:
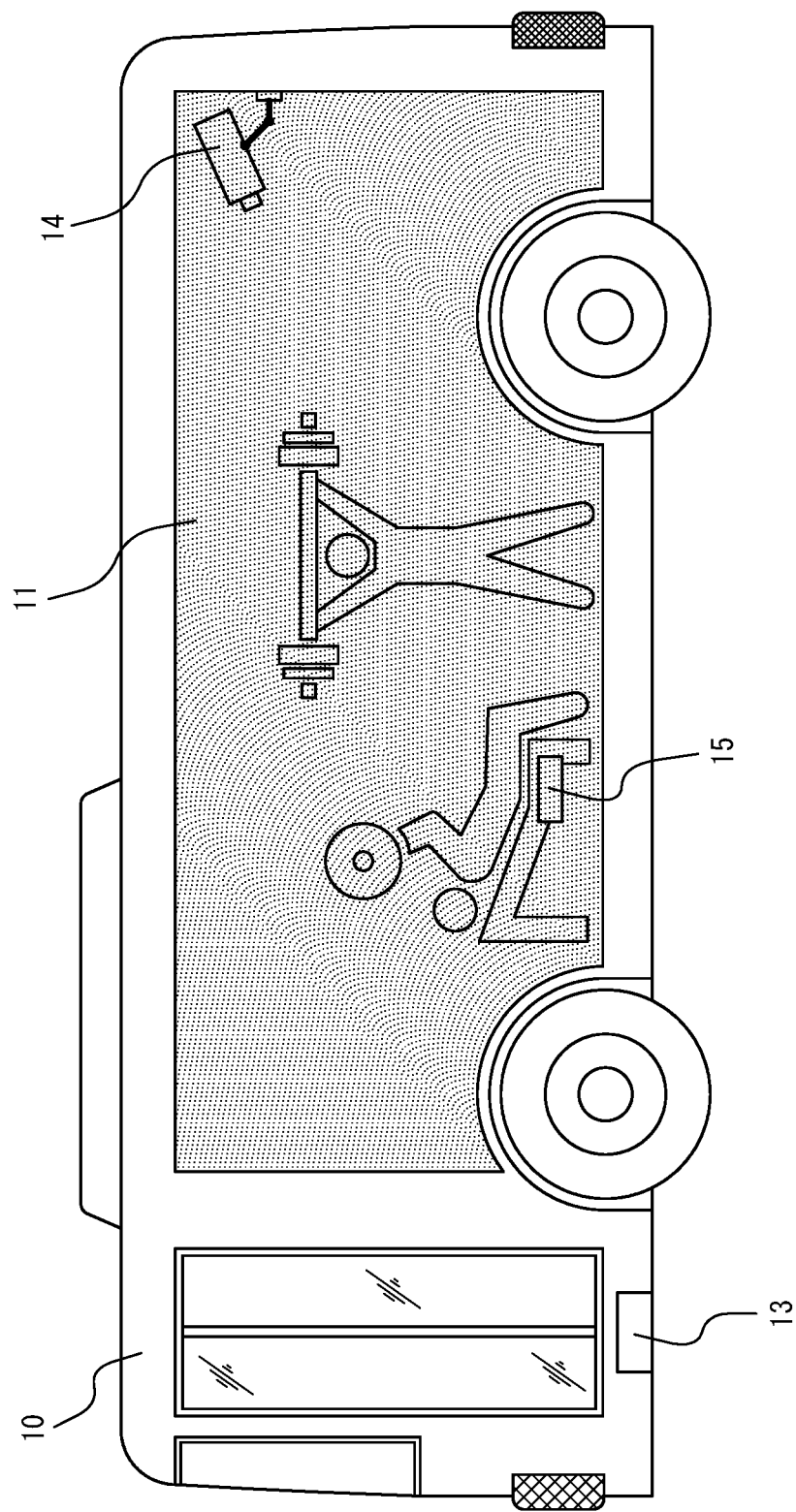
FIG. 2 is further schematic diagram illustrating the outline of the vehicle according to one embodiment of the present disclosure.

Further, even in a case in which it is determined that the type of the area through which the vehicle 10 travels is an urban area, when it is determined from the second information indicating the state of the interior of the vehicle 10, that passengers of the vehicle 10 do not desire to allow the interior of the vehicle 10 to be viewed from outside, as illustrated in FIG. 2, the vehicle 10 lowers the degree of visibility between the exterior and the interior of the vehicle. In this manner, the vehicle 10 can prevent a reduction in the level of satisfaction of the passengers inside the vehicle 10.

Figure 3:
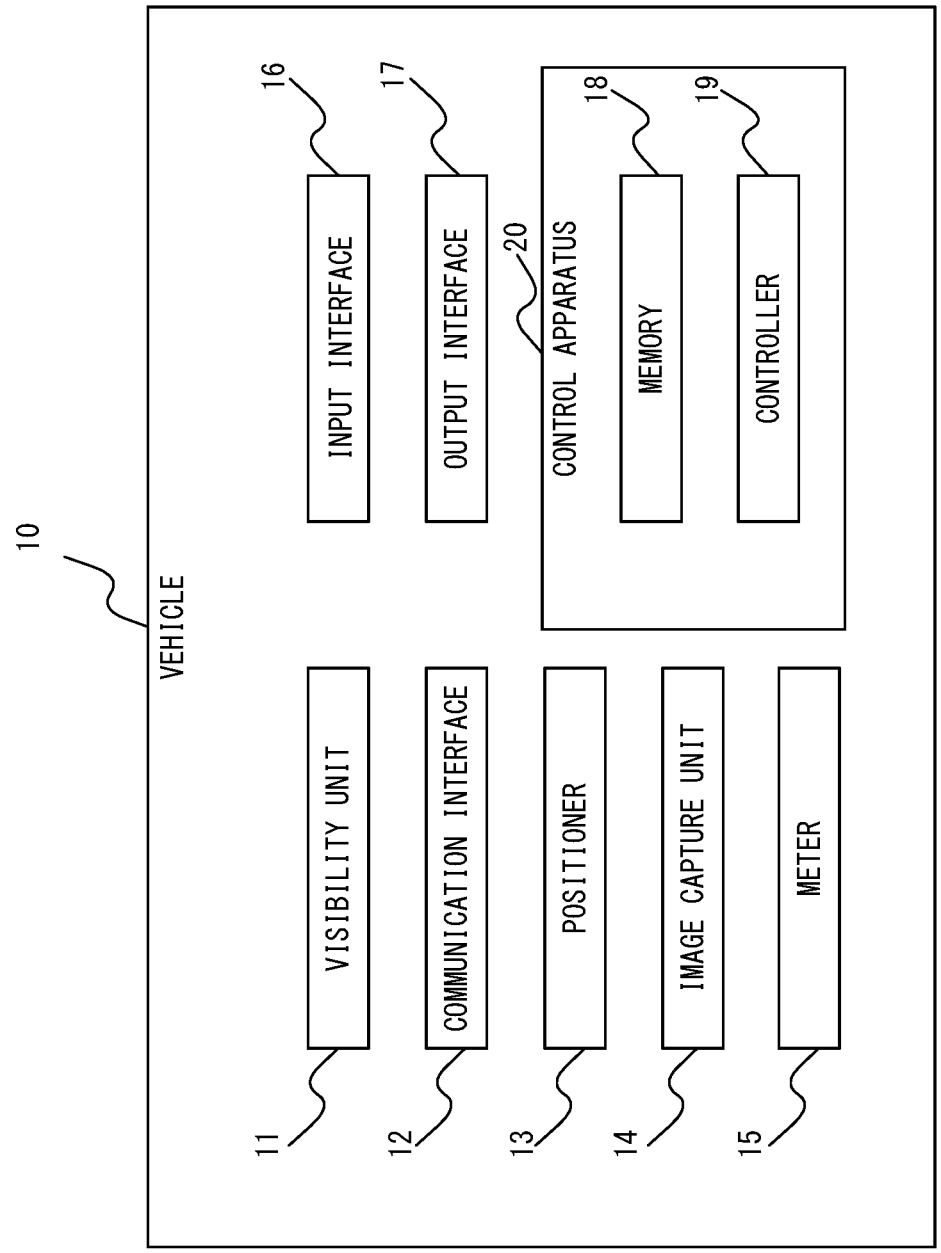
FIG. 3 is a block diagram illustrating a schematic configuration of the vehicle according to one embodiment of the present disclosure.

A configuration of the vehicle 10 according to the present embodiment will be described with reference to FIG. 3.

The vehicle 10 includes the visibility unit 11, a communication interface 12, a positioner 13, an image capture unit 14, a meter 15, an input interface 16, an output interface 17, a memory 18, and a controller 19. The visibility unit 11, the communication interface 12, the positioner 13, the image capture unit 14, the meter 15, the input interface 16, the output interface 17, the memory 18 and the controller 19 are connected so as to be able to perform communication with each other via, for example, an in-vehicle network such as a CAN (Controller Area Network) or a dedicated line.

A control apparatus 20 provided in the vehicle 10 may include at least one of the visibility unit 11, the communication interface 12, the positioner 13, the image capture unit 14, the meter 15, the input interface 16, the output interface 17, the memory 18 and the controller 19. The control apparatus 20 is an apparatus which controls at least some of the mechanisms provided in the vehicle 10. The control apparatus 20 is, for example, an ECU (Electronic Control Unit) provided to the vehicle 10. However, the control apparatus 20 is not limited to the ECU and may be any suitable in-vehicle apparatus such as a car navigation apparatus. For example, FIG. 3 illustrates an example where the control apparatus 20 includes the memory 18 and the controller 19.

The visibility unit 11 can change the degree of visibility between the exterior and the interior of the vehicle 10. The visibility unit 11 can change the degree of visibility of interior from the exterior of the vehicle 10 and the degree of visibility of the exterior from the interior of the vehicle 10. In the present embodiment, the visibility unit 11 includes, for example, a windshield whose transmittance can be changed. In a case in which the visibility unit 11 includes a windshield whose transmittance can be changed, the degree of visibility between the exterior and the interior of the vehicle 10 is changed by changing transmittance of the windshield. In the present embodiment, as illustrated in FIG. 1, the visibility unit 11 is provided on a side surface of the vehicle 10. However, the position where the visibility unit 11 is provided is not limited to the side surface of the vehicle 10, and the visibility unit 11 may be provided at any suitable position such as a front surface, a back surface or an upper surface.

The visibility unit 11 is not limited to a windshield whose transmittance can be changed, and may include a door which can be open and closed, a window shade, a curtain, a display, or the like. In a case in which the visibility unit 11 includes a door which can be open and closed, the degree of visibility between the exterior and the interior of the vehicle 10 is changed by changing an area of the door which is open. In a case in which the visibility unit 11 includes a window shade or a curtain, the degree of visibility between the exterior and the interior of the vehicle 10 is changed by changing an area in which the window shade or the curtain is open. In a case in which the visibility unit 11 includes a display, the visibility unit 11 may include a display arranged to face outside of the vehicle 10 and a display arranged to face inside. In a case in which the display is arranged to face outside of the vehicle 10, an image of the interior of the vehicle 10 is displayed on the display. In a case in which the display is arranged to face inside of the vehicle 10, an image of the exterior of the vehicle 10 is displayed on the display. The visibility unit 11 changes the degree of visibility between the exterior and the interior of the vehicle 10 by changing a display image of at least one of the display arranged to face outside of the vehicle 10 and the display arranged to face inside of the vehicle 10. Changing the display image of the display includes, for example, switching between ON and OFF of the display, changing a resolution, a display area or a size of the image displayed on the display, display of an image subjected to processing such as blurring and distortion, or the like. The display arranged to face outside of the vehicle 10 and the display arranged to face inside may be controlled so as to have the same degree of visibility or may be controlled to have different degrees of change. For example, only the degree of visibility of the display arranged to face outside may be changed without the degree of visibility of the display arranged to face inside being changed. In this manner, because passengers inside the vehicle 10 are not affected by a change of the degree of visibility of the visibility unit 11, it is possible to prevent a reduction in the level of satisfaction of the passengers.

The communication interface 12 includes one or more communication modules. The communication module is, for example, a communication module supporting mobile communication standards such as 4G (4th Generation) and 5G (5th Generation). The communication module may be a communication module which supports near field communication standards such as Wi-Fi (Wi-Fi is a registered trademark in Japan, other countries, or both) and Bluetooth (Bluetooth is a registered trademark in Japan, other countries, or both) and infrared communication. The communication module may be a communication module which supports communication standards for an in-vehicle network such as a CAN described above. For example, in-vehicle communication equipment may function as the communication interface 12. In the present embodiment, the communication interface 12 transmits and receives information to and from information processing apparatuses, or the like, external to the vehicle, which are connected in accordance with mobile communication standards.

The positioner 13 acquires position information for the vehicle 10. The positioner 13 may include a receiver which supports a satellite positioning system. The satellite positioning system supported by the receiver may be, for example, GPS (Global Positioning System). For example, a car navigation apparatus may function as the positioner 13.

The image capture unit 14 captures an image of the interior or the exterior of the vehicle 10. The image capture unit 14 may include, for example, a camera. For example, an in-vehicle camera such as a dashboard camera may function as the image capture unit 14.

The meter 15 measures a physical quantity of the interior or the exterior of the vehicle 10. The meter 15 may include a sensor such as, for example, a speedometer, an acceleration sensor, a gyro sensor, a human-presence sensor, an illuminance sensor, a thermometer, a hygrometer, a raindrop sensor or a radar. When the meter 15 measures a physical quantity, the meter 15 converts the physical quantity into an electrical signal.

The input interface 16 accepts input operations. The input interface 16 may be any suitable input apparatus such as, for example, a touch panel, a camera, a microphone or an IC card reader. When the input interface 16 accepts an input operation, the input interface 16 converts the input operation into an electrical signal.

The output interface 17 outputs information using images, sounds, or the like. The output interface 17 may be any suitable output apparatus such as, for example, a display or a speaker.

The memory 18 may be, for example, a semiconductor memory, a magnetic memory, an optical memory, or the like. The memory 18 may function as, for example, a main storage apparatus, an auxiliary storage apparatus or a cache memory. The memory 18 stores arbitrary information to be used for operation of each function of the vehicle 10 and the control apparatus 20. For example, the memory 18 may store a system program, an application program, built-in software, or the like.

The controller 19 includes one or more processors. The processor may be, for example, a general-purpose processor such as a CPU (Central Processing Unit), a dedicated processor which is dedicated to particular processing, or the like. The controller 19 is not limited to a processor, and may include one or more dedicated circuits. The dedicated circuit may be, for example, an FPGA (Field-Programmable Gate Array), or an ASIC (Application Specific Integrated Circuit). The controller 19 may respectively control the visibility unit 11, the communication interface 12, the positioner 13, the image capture unit 14, the meter 15, the input interface 16, the output interface 17 and the memory 18 described above to realize functions thereof.

Figure 4:
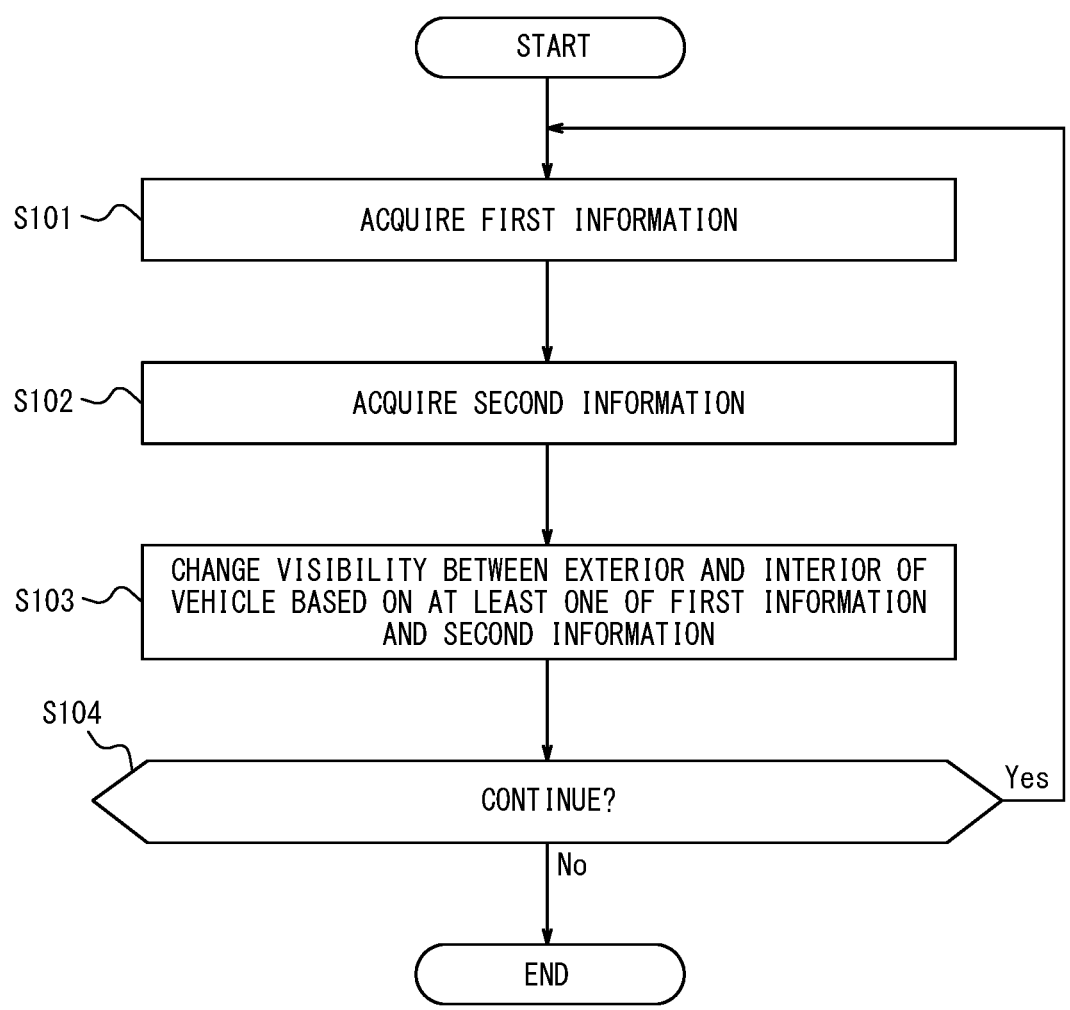
FIG. 4 is a flowchart illustrating operation of the vehicle.

Operation of the vehicle 10 to be realized by each function of the vehicle 10 controlled by the controller 19 will be described with reference to FIG. 4. The operation of the vehicle 10 corresponds to a control method of the vehicle 10 and a control method of the control apparatus 20 of the vehicle 10.

In step S101, the controller 19 acquires first information indicating a state of the exterior of the vehicle 10.

The first information is information indicating a state of the exterior of the vehicle 10. As will be described later, the first information is used to determine the number of viewing persons who view the interior of the vehicle 10 from the exterior. The first information includes, for example, an image of the exterior of the vehicle 10, the number of mobile terminals outside the vehicle 10, or the like. Further, the first information may include information indirectly indicating the state of the exterior of the vehicle 10 such as position information of the vehicle 10 and speed information. Specifically, the controller 19 may capture an image of the exterior of the vehicle 10 with the camera included in the image capture unit 14. The controller 19 may perform near field communication using the communication interface 12, and may acquire the number of mobile terminals with which communication is possible as the number of mobile terminals outside the vehicle 10. The controller 19 may acquire a two-dimensional coordinate, or the like, of the vehicle 10 with the GPS receiver included in the positioner 13 as the position information. Alternatively, the controller 19 may acquire speed information such as the speed of the vehicle 10 and acceleration using the speedometer included in the meter 15. The controller 19 may cause the acquired first information to be stored in the memory 18.

In step S102, the controller 19 acquires second information indicating a state of the interior of the vehicle 10.

The second information is information indicating a state of the interior of the vehicle 10. As will be described later, the second information is used to determine a viewing allowance level for viewing the interior of the vehicle 10 from the exterior. The second information may include, for example, an image of the interior of the vehicle 10, a usage state of equipment provided inside the vehicle 10, and information regarding the interior of the vehicle 10 input through input operations by passengers of the vehicle 10. Specifically, the controller 19 may capture an image of the interior of the vehicle 10 with the camera included in the image capture unit 14. The controller 19 may acquire a usage state of equipment with a sensor included in the meter 15 provided to the equipment inside the vehicle 10. Alternatively, the controller 19 may acquire information regarding the interior of the vehicle 10 input through input operations by passengers inside the vehicle 10 using the touch panel included in the input interface 16. The controller 19 may cause the acquired second information to be stored in the memory 18. In the present embodiment, the communication interface 12, the positioner 13, the image capture unit 14, the meter 15 and the input interface 16 will be collectively referred to as an acquisition interface in a case in which they are used to acquire the first information or the second information.

In step S103, the controller 19 changes the degree of visibility between the exterior and the interior of the vehicle 10 on the basis of at least one of the first information and the second information.

In step S103, the controller 19 may change the degree of visibility between the exterior and the interior of the vehicle 10 on the basis of the first information.

Specifically, the controller 19 determines the number of viewing persons who view the interior of the vehicle 10 from the exterior on the basis of the first information. The number of viewing persons of the vehicle 10 is information indicating the degree to which the interior of the vehicle 10 is viewed by persons located outside the vehicle 10. The number of viewing persons of the vehicle 10 includes, for example, the number of persons who view the interior of the vehicle 10 from the exterior. The number of viewing persons of the vehicle 10 is not limited to information obtained by directly quantifying the number of persons, and may include information indirectly indicating the number of persons who view the interior of the vehicle 10 from outside, such as a probability, a frequency, accuracy, or the like, of the interior of the vehicle 10 being viewed by persons located outside the vehicle 10.

In a case in which an image of the exterior of the vehicle 10 is acquired as the first information, the controller 19 may determine the number of viewing persons of the vehicle 10 on the basis of the number of persons appearing in the image extracted using an image recognition technology such as face detection. In a case in which the number of mobile terminals outside the vehicle 10 is acquired as the first information, the controller 19 may determine the number of viewing persons of the vehicle 10 on the basis of the number of mobile terminals. In a case in which position information for the vehicle 10 is acquired as the first information, the controller 19 may determine the type of an area through which the vehicle 10 travels, corresponding to the position information. The type of the area may include, for example, an urban area, a suburb, an expressway, a costal road, a mountain road, or the like. The type of the area may be stored in, for example, the memory 18 in advance, in association with the position information of the vehicle 10. The controller 19 may determine the number of viewing persons of the vehicle 10 on the basis of the type of the area. For example, the controller 19 may determine that more persons are located outside the vehicle 10 and the number of viewing persons is greater in a case in which the type of the area through which the vehicle 10 travels is an urban area than in a case in which the type of the area is a suburb or an expressway. Alternatively, in a case in which speed information for the vehicle 10 is acquired as the first information, the controller 19 may determine whether persons located outside the vehicle 10 can view the interior of the vehicle 10 from the speed of the vehicle 10 and may determine the number of viewing persons. For example, the controller 19 may determine that the number of viewing persons who can view the interior with high accuracy is greater in a case in which the speed of the vehicle 10 is lower than in a case in which the speed is higher, because persons located outside the vehicle 10 can view the interior of the vehicle 10 for a longer period of time.

The controller 19 changes the degree of visibility between the exterior and the interior of the vehicle 10 on the basis of the determined number of viewing persons who view the interior of the vehicle 10 from outside. For example, the controller 19 may increase the degree of visibility between the exterior and the interior of the vehicle 10 as the determined number of viewing persons who view the interior of the vehicle 10 from outside increases. Specifically, in a case in which the number of viewing persons is equal to or greater than a first threshold, the controller 19 may enable visibility between the exterior and the interior of the vehicle 10. For example, the first threshold may be the number of viewing persons at which effective advertising can be expected in a case in which the interior of the vehicle 10 is made visible from outside. The controller 19 may enable visibility between the exterior and the interior of the vehicle 10 by making the degree of visibility of the visibility unit 11 equal to or greater than predetermined degree of visibility. The controller 19 may store conditions such as the first threshold and the predetermined degree of visibility in the memory 18 in advance. The predetermined degree of visibility may include a condition of transmittance of the windshield which is included in the visibility unit 11 and whose transmittance can be changed. The controller 19 may enable visibility between the exterior and the interior of the vehicle 10 by changing the transmittance of the windshield to equal to or greater than the transmittance included in the predetermined degree of visibility. Further, the predetermined degree of visibility may include a condition for an area of the windshield included in the visibility unit 11, which is made visible. The controller 19 may enable visibility between the exterior and the interior of the vehicle 10 by changing an area of the windshield which is made visible to equal to or greater than the area included in the predetermined degree of visibility. The predetermined degree of visibility may be appropriately determined in accordance with a type, use application, or the like, of the vehicle 10. The predetermined degree of visibility may be adjusted to an appropriate value in accordance with the traveling speed of the vehicle 10, a level of sunlight outside, the weather, or the like. Further, the controller 19 may store a set of a plurality of thresholds and degree of visibility corresponding to the thresholds concerning the number of viewing persons. The controller 19 may increase the degree of visibility between the exterior and the interior of the vehicle 10 in a stepwise manner as the determined number of viewing persons who view the interior of the vehicle 10 from outside increases by using the sets.

Meanwhile, the controller 19 may increase the degree of visibility between the exterior and the interior of the vehicle 10 as the determined number of viewing persons who view the interior of the vehicle 10 from outside decreases. Specifically, the controller 19 may enable visibility between the exterior and the interior of the vehicle 10 in a case in which the number of viewing persons is equal to or less than a second threshold. For example, the second threshold may be the number of viewing persons whose lines of sight from outside of the vehicle 10 do not bother passengers inside the vehicle 10 in a case in which visibility between the exterior and the interior of the vehicle 10 is enabled. As described above, the controller 19 may enable visibility between the exterior and the interior of the vehicle 10 by making the degree of visibility of the visibility unit 11 equal to or greater than the predetermined degree of visibility. The controller 19 may store conditions such as the second threshold and the predetermined degree of visibility in the memory 18 in advance. Further, the controller 19 may store a set of a plurality of thresholds and degrees of visibility corresponding to the thresholds concerning the number of viewing persons. The controller 19 may increase the degree of visibility between the exterior and the interior of the vehicle 10 in a stepwise manner as the determined number of viewing persons who view the interior of the vehicle 10 from outside decreases by using the sets.

In step S103, the controller 19 may change the degree of visibility between the exterior and the interior of the vehicle 10 on the basis of the second information.

Specifically, the controller 19 determines a viewing allowance level for viewing the interior of the vehicle 10 from the exterior on the basis of the second information. The viewing allowance level of the vehicle 10 is information indicating the degree to which passengers inside the vehicle 10 allow the interior of the vehicle 10 to be viewed from the exterior. The viewing allowance level of the vehicle 10 includes, for example, the number of passengers who allow the interior of the vehicle 10 to be viewed from the exterior. The viewing allowance level of the vehicle 10 is not limited to the number of persons, and may further include the number of pieces of equipment inside the vehicle 10 which are not used, or the like.

In a case in which an image of the interior of the vehicle 10 is acquired as the second information, the controller 19 may determine the viewing allowance level of the vehicle 10 on the basis of the number of persons appearing in the image extracted using an image recognition technology such as face detection. For example, in a case in which it is determined that there are no persons inside the vehicle 10 from the image of the interior of the vehicle 10; that is, in a case in which it is determined that there are no passengers, the controller 19 may determine that the viewing allowance level of the vehicle 10 is high. In a case in which a usage state of equipment provided inside the vehicle 10 is acquired as the second information, the controller 19 may determine that the viewing allowance level is high at or around equipment which is not being used by the passengers. In a case in which an input operation indicating that viewing is allowed is accepted from passengers of the vehicle 10 as the second information, the controller 19 may determine that the viewing allowance level of the vehicle 10 is high. Meanwhile, in a case in which an input operation indicating that viewing is not allowed is accepted from passengers of the vehicle 10 as the second information, the controller 19 may determine that the viewing allowance level of the vehicle 10 is low.

The controller 19 changes the degree of visibility between the exterior and the interior of the vehicle 10 on the basis of the determined viewing allowance level for viewing the interior of the vehicle 10 from outside. For example, in a case in which the viewing allowance level is equal to or greater than a third threshold, the controller 19 may enable visibility between the exterior and the interior of the vehicle 10. For example, in a case in which the interior of the vehicle 10 is made visible from the exterior, the third threshold may be the viewing allowance level at which the level of satisfaction of the passengers of the vehicle 10 falls to within an allowed level. As described above, the controller 19 may enable visibility between the exterior and the interior of the vehicle 10 by making the degree of visibility of the visibility unit 11 equal to or greater than the predetermined degree of visibility. The controller 19 may store conditions such as the third threshold and the predetermined degree of visibility in the memory 18 in advance. Further, the controller 19 may store a set of a plurality of thresholds and degrees of visibility corresponding to the thresholds concerning the viewing allowance level. The controller 19 may increase the degree of visibility between the exterior and the interior of the vehicle 10 in a stepwise manner as the determined viewing allowance level for the interior of the vehicle 10 being viewed from outside increases using the sets.

In step S103, the controller 19 may change the degree of visibility between the exterior and the interior of the vehicle 10 on the basis of the first information and the second information.

As described above, the controller 19 determines the number of viewing persons who view the interior of the vehicle 10 from outside determined on the basis of the first information, and the viewing allowance level for the interior of the vehicle 10 being viewed from outside determined on the basis of the second information. The controller 19 may change the degree of visibility between the exterior and the interior of the vehicle 10 on the basis of the determined number of viewing persons and the determined viewing allowance level. Specifically, even in a case in which the number of viewing persons satisfies a condition for enabling visibility between the exterior and the interior of the vehicle 10, when the viewing allowance level does not satisfy a condition for enabling visibility between the exterior and the interior of the vehicle 10, the controller 19 does not enable visibility between the exterior and the interior of the vehicle 10. For example, even in a case in which it is determined that sufficiently effective advertising can be obtained on the basis of the number of viewing persons, when it is determined that the viewing allowance level of the passengers of the vehicle 10 is low, the controller 19 does not increase the degree of visibility between the exterior and the interior of the vehicle 10. Alternatively, even in a case in which the viewing allowance level satisfies a condition for enabling visibility between the exterior and the interior of the vehicle 10, when the number of viewing persons does not satisfy a condition for enabling visibility between the exterior and the interior of the vehicle 10, the controller 19 does not enable visibility between the exterior and the interior of the vehicle 10. For example, even in a case in which it is determined that agreement of the passengers of the vehicle 10 can be obtained, and the viewing allowance level is high, when it is determined that sufficiently effective advertising cannot be obtained on the basis of the number of viewing persons, the controller 19 does not increase the degree of visibility between the exterior and the interior of the vehicle 10.

In step S104, the controller 19 determines whether or not to continue the present processing. In a case in which the controller 19 determines to continue the processing (step S104: Yes), the controller 19 may repeatedly change the degree of visibility between the exterior and the interior of the vehicle 10 by executing processing from step S101. In the present embodiment, a predetermined timing may be, for example, a timing regularly repeated at predetermined time intervals. However, the predetermined timing may be a timing which is not regularly repeated, and may be irregularly repeated. By repeating the present processing, for example, even in a case in which a state of the exterior or the interior of the vehicle 10 changes in association with traveling of the vehicle 10, the controller 19 can automatically change the degree of visibility between the exterior and the interior of the vehicle 10 in accordance with the change in the state of the exterior or the interior of the vehicle 10.

Vehicle Operation Example

Operation of the vehicle 10 will be described below using specific examples with reference to FIG. 1, FIG. 2 and FIG. 5. For example, it is assumed that the vehicle 10 is a vehicle in which the interior of the vehicle 10 is a gym provided with equipment for passengers to exercise. The vehicle 10 includes the visibility unit 11 which includes a windshield whose transmittance can be changed. As illustrated in FIG. 2, it is assumed that, in a case in which it is determined from an image captured by the image capture unit 14 that a passenger is in the vehicle 10, the vehicle 10 travels while lowering the transmittance of the windshield of the visibility unit 11 to lower the degree of visibility between the exterior and the interior of the vehicle 10.

For example, it is assumed that the vehicle 10 is traveling through a suburb. Because a type of the area through which the vehicle 10 travels is a suburb from the position information of the vehicle 10 acquired by the positioner 13, the vehicle 10 determines that there are relatively few viewing persons outside the vehicle 10. As a result, as illustrated in FIG. 1, the transmittance of the windshield of the visibility unit 11 is increased, and the degree of visibility between the exterior and the interior of the vehicle is increased. In this manner, the vehicle 10 can improve the level of satisfaction of the passengers by allowing the passengers inside the vehicle 10 to work out in an open environment by showing scenery outside the vehicle 10.

Next, it is assumed that the vehicle 10 is traveling through an urban area. Because the type of an area through which the vehicle 10 travels is an urban area from the position information of the vehicle 10 acquired by the positioner 13, the vehicle 10 determines that there are many viewing persons outside the vehicle 10. In this manner, the vehicle 10 determines that effective advertising for the service provided inside the vehicle 10 can be improved by making the interior of the vehicle 10 visible. Meanwhile, in a case where it is determined from a usage state of the training equipment of the vehicle 10 acquired by the meter 15 that all equipment is being used by the passengers, the vehicle 10 determines that the viewing allowance level is low. As a result, as illustrated in FIG. 2, the vehicle 10 maintains a low degree of visibility between the exterior and the interior of the vehicle 10. In this manner, the vehicle 10 prevents a reduction in the level of satisfaction of the passengers.

Thereafter, the vehicle 10 determines from the usage state of the training equipment of the vehicle 10 acquired by the meter 15 that there is equipment which is not used by a passenger. In this case, the vehicle 10 can determine that the viewing allowance level is high around the equipment which is not used by the passengers. As a result, as illustrated in FIG. 5, the vehicle 10 increases the degree of visibility between the exterior and the interior of the vehicle 10 only around the equipment which is not used by the passengers. In this manner, the vehicle 10 can improve the effectiveness of advertising for the service provided inside the vehicle 10 by showing the condition of the interior of the vehicle 10 to prospective customers who are walking outside the vehicle 10 within a particular range, without lowering the level of satisfaction of the passengers.

As described above, the control apparatus 20 according to the present embodiment is the control apparatus 20 of the vehicle 10. The control apparatus 20 includes the controller 19. The controller 19 changes the degree of visibility between the exterior and the interior of the vehicle 10 on the basis of at least one of first information indicating a state of the exterior of the vehicle 10 and second information indicating a state of the interior of the vehicle 10. According to such a configuration, the control apparatus 20 of the vehicle 10 can make the interior of the vehicle 10 visible from the exterior or make the exterior visible from the interior, from the state of the exterior or the interior of the vehicle 10. In this manner, for example, it is possible to improve the effectiveness of advertising for the service provided inside the vehicle 10 by showing the state of the interior of the vehicle 10 to prospective customers who are walking outside the vehicle 10. Alternatively, it is possible to improve the level of satisfaction of the passengers by creating an open environment by showing scenery outside the vehicle 10 to the passengers inside the vehicle 10. Therefore, the user-friendliness of a technique for providing information to the interior or the exterior of a vehicle is improved.

In the control apparatus 20 of the vehicle 10 according to the present embodiment, the first information may include an image of the exterior of the vehicle 10. The controller 19 can change the degree of visibility on the basis of the number of persons appearing in the image of the exterior of the vehicle 10. According to such a configuration, the control apparatus 20 of the vehicle 10 can determine whether there are many or few opportunities for viewing of the interior of the vehicle 10 from the exterior on the basis of the number of persons appearing in the image, and can change the degree of visibility between the exterior and the interior of the vehicle 10.

In the control apparatus 20 of the vehicle 10 according to the present embodiment, the first information may include position information for the vehicle 10. The controller 19 can change the degree of visibility on the basis of the type of an area corresponding to the position information for the vehicle 10. According to such a configuration, the control apparatus 20 of the vehicle 10 can determine whether there are many or few opportunities for viewing the interior of the vehicle 10 from the exterior and can change the degree of visibility between the exterior and the interior of the vehicle 10 in accordance with the type of the area through which the vehicle 10 travels.

In the control apparatus 20 of the vehicle 10 according to the present embodiment, the controller 19 can determine the number of viewing persons who view the interior of the vehicle 10 from the exterior and can change the degree of visibility on the basis of the first information. According to such a configuration, the control apparatus 20 of the vehicle 10 can change the degree of visibility between the exterior and the interior of the vehicle 10 in accordance with the determined number of viewing persons.

In the control apparatus 20 of the vehicle 10 according to the present embodiment, in a case in which the number of viewing persons is equal to or greater than a first threshold, the controller 19 can enable visibility between the exterior and the interior of the vehicle 10. According to such a configuration, for example, in a case in which there are many prospective customers outside the vehicle 10 and effective advertising of the service provided inside the vehicle 10 can be expected, the controller 19 enable visibility between the exterior and the interior of the vehicle 10. In this manner, the control apparatus 20 of the vehicle 10 can improve the effectiveness of advertising by opening the interior of the vehicle 10 to outside.

In the control apparatus 20 of the vehicle 10 according to the present embodiment, in a case in which the number of viewing persons is equal to or less than a second threshold, the controller 19 can enable visibility between the exterior and the interior of the vehicle 10. According to such a configuration, for example, in a case in which there are relatively few persons outside the vehicle 10 and there is a little possibility that the interior of the vehicle 10 is viewed, the controller 19 can create an open environment by showing scenery outside the vehicle 10 to passengers inside the vehicle 10. In this manner, the control apparatus 20 of the vehicle 10 can further improve the level of satisfaction of passengers by allowing the exterior of the vehicle 10 to be visible from the interior.

In the control apparatus 20 of the vehicle 10 according to the present embodiment, the first information may include an image of the interior of the vehicle 10. The controller 19 can change the degree of visibility on the basis of the number of persons appearing in the image of the interior of the vehicle 10. According to such a configuration, the control apparatus 20 of the vehicle 10 can determine the number of passengers of the vehicle 10 and can change the degree of visibility between the exterior and the interior of the vehicle 10 in accordance with the number of persons appearing in the image.

In the control apparatus 20 of the vehicle 10 according to the present embodiment, the controller 19 can determine a viewing allowance level for the interior of the vehicle 10 being viewed from the exterior and can change the degree of visibility on the basis of second information. According to such a configuration, the control apparatus 20 of the vehicle 10 can change the degree of visibility between the exterior and the interior of the vehicle 10 in accordance with the viewing allowance level of passengers in the vehicle 10 being viewed.

In the control apparatus 20 of the vehicle 10 according to the present embodiment, in a case in which the viewing allowance level is equal to or greater than a third threshold, the controller 19 can enable visibility between the exterior and the interior of the vehicle 10. According to such a configuration, in a case in which the viewing allowance level for passengers in the vehicle 10 is low, the control apparatus 20 of the vehicle 10 does not enable visibility between the exterior and the interior of the vehicle 10, so that it is possible to prevent a reduction in the level of satisfaction of the passengers of the vehicle 10.

In the control apparatus 20 of the vehicle 10 according to the present embodiment, the controller 19 can change the degree of visibility between the exterior and the interior of the vehicle 10 by changing the transmittance of the windshield provided to the vehicle 10. According to such a configuration, the control apparatus 20 of the vehicle 10 can collectively change the degree of visibility in a case in which the interior of the vehicle 10 is viewed from the exterior, and the degree of visibility in a case in which the exterior of the vehicle 10 is viewed from the interior.

In the control apparatus 20 of the vehicle 10 according to the present embodiment, the controller 19 can change the degree of visibility between the exterior and the interior of the vehicle 10 by changing a display image of at least one of a display arranged to face outside of the vehicle 10 and a display arranged to face inside of the vehicle 10. According to such a configuration, the control apparatus 20 of the vehicle 10 can individually change the degree of visibility in a case in which the interior of the vehicle 10 is viewed from the exterior and the degree of visibility in a case in which the exterior of the vehicle 10 is viewed from inside.

The vehicle 10 according to the present embodiment includes the control apparatus 20 described above. According to such a configuration, the vehicle 10 can make the interior of the vehicle 10 visible from the exterior or make the exterior visible from the interior, from a state of the exterior or interior of the vehicle 10. In this manner, for example, it is possible to improve the effectiveness of advertising of a service provided inside the vehicle 10 by showing the of the interior of the vehicle 10 to prospective customers who are walking outside the vehicle 10. Alternatively, it is possible to improve the level of satisfaction of passengers by creating an open environment by showing scenery outside the vehicle 10 to the passengers inside the vehicle 10. Therefore, the user-friendliness of a technique for providing information to the interior or the exterior of a vehicle is improved.

A control method according to the present embodiment is a control method for the vehicle 10. The control method includes a step in which the controller 19 changes the degree of visibility between the exterior and the interior of the vehicle 10 on the basis of at least one of first information indicating a state of the exterior of the vehicle 10 and second information indicating a state of the interior of the vehicle 10. According to such a configuration, the vehicle 10 can make the interior of the vehicle 10 visible from the exterior or can make the exterior visible from the interior, from a state of the exterior or the interior of the vehicle 10. In this manner, for example, it is possible to improve the effectiveness of advertising of the service provided inside the vehicle 10 by showing a condition of the interior of the vehicle 10 to prospective customers who are walking outside the vehicle 10. Alternatively, it is possible to improve the level of satisfaction of passengers by creating an open environment by showing scenery outside the vehicle 10 to the passengers inside the vehicle 10. Therefore, user-friendliness of a technique for providing information to the interior or the exterior of a vehicle is improved.

While the present disclosure has been described on the basis of the drawings and examples, it is to be noted that a person skilled in the art can easily make various modifications and corrections on the basis of the present disclosure. Therefore, it is to be noted that these modifications and alterations are included in the scope of the present disclosure. For example, it is possible to rearrange functions, or the like, included in the respective means, the respective steps, or the like, without producing logical inconsistency, and it is possible to combine a plurality of means, steps, or the like, to make one means, step, or the like, or divide the means, steps, or the like.

For example, in the above-described embodiment, all or part of functions or processing described as the functions or the processing of the control apparatus 20 may be realized as functions or processing of a general-purpose information processing apparatus such as, for example, a smartphone and a computer. Specifically, it is also possible to store a program which describes processing content for realizing respective functions of the control apparatus 20 according to the embodiment in a memory of an information processing apparatus and cause a processor of the information processing apparatus to read out and execute the program. Therefore, the disclosure according to the present embodiment can be realized as a program which can be executed by a processor. For example, in a case where a general-purpose information processing apparatus is caused to function as the control apparatus 20 of the vehicle 10, the disclosure according to the present embodiment can be realized by providing an information processing apparatus having the above-described configuration and functions as the configuration and the functions of the control apparatus 20 of the vehicle 10, in the vehicle 10.

The invention claimed is:

1. A control apparatus for a vehicle, comprising:
a controller configured to change the degree of visibility between an exterior and an interior of the vehicle based on at least one of first information indicating a state of the exterior of the vehicle and second information indicating a state of the interior of the vehicle.

2. The control apparatus according to claim 1,
wherein the first information includes an image of the exterior of the vehicle, and
the controller changes the degree of visibility based on a number of persons appearing in the image of the exterior of the vehicle.

3. The control apparatus according to claim 1,
wherein the first information includes position information for the vehicle, and
the controller changes the degree of visibility based on a type of an area corresponding to the position information of the vehicle.

4. The control apparatus according to claim 1,
wherein the controller determines a number of viewing persons who view the interior of the vehicle from the exterior and changes the degree of visibility based on the first information.

5. The control apparatus according to claim 4,
wherein, in a case in which the number of viewing persons is equal to or greater than a first threshold, the controller enables visibility between the exterior and the interior of the vehicle.

6. The control apparatus according to claim 4,
wherein, in a case in which the number of viewing persons is equal to or less than a second threshold, the controller enables visibility between the exterior and the interior of the vehicle.

7. The control apparatus according to claim 1,
wherein the second information includes an image of the interior of the vehicle, and
the controller changes the degree of visibility based on a number of persons appearing in the image of the interior of the vehicle.

8. The control apparatus according to claim 1,
wherein the controller determines a viewing allowance level for viewing the interior of the vehicle from the exterior and changes the degree of visibility based on the second information.

9. The control apparatus according to claim 8, wherein, in a case in which the viewing allowance level is equal to or greater than a third threshold, the controller enables visibility between the exterior and the interior of the vehicle.

10. The control apparatus according to claim 1, wherein the controller changes the degree of visibility by changing transmittance of a windshield provided to the vehicle.

11. The control apparatus according to claim 1, wherein the controller changes the degree of visibility by changing a display image of at least one of a display arranged to face outside the vehicle and a display arranged to face inside the vehicle.

12. A vehicle comprising the control apparatus according to claim 1.

13. A control method for a vehicle, comprising: changing, by a controller, the degree of visibility between an exterior and an interior of the vehicle based on at least one of first information indicating a state of the exterior of the vehicle and second information indicating a state of the interior of the vehicle.

14. The control method according to claim 13, wherein the first information includes an image of the exterior of the vehicle, and the controller changes the degree of visibility based on a number of persons appearing in the image of the exterior of the vehicle.

15. The control method according to claim 13, wherein the first information includes position information for the vehicle, and the controller changes the degree of visibility based a type of an area corresponding to the position information for the vehicle.

16. The control method according to claim 13, wherein the controller determines a number of viewing persons who view the interior of the vehicle from the exterior and changes the degree of visibility based on the first information.

17. The control method according to claim 16, wherein, in a case in which the number of viewing persons is equal to or greater than a first threshold, the controller enables visibility between the exterior and the interior of the vehicle.

18. The control method according to claim 16, wherein, in a case in which the number of viewing persons is equal to or less than a second threshold, the controller enables visibility between the exterior and the interior of the vehicle.

19. The control method according to claim 13, wherein the second information includes an image of the interior of the vehicle, and the controller changes the degree of visibility based on a number of persons appearing in the image of the interior of the vehicle.

20. The control method according to claim 13, wherein the controller determines a viewing allowance level for viewing the interior of the vehicle from the exterior and changes the degree of visibility based on the second information.

* * * * *